(12) United States Patent
Barzelay et al.

(10) Patent No.: US 11,521,018 B1
(45) Date of Patent: Dec. 6, 2022

(54) RELEVANT TEXT IDENTIFICATION BASED ON IMAGE FEATURE SELECTION

(71) Applicant: Amazon Technologies, Inc., Seattle, WA (US)

(72) Inventors: Zohar Barzelay, Potsdam (DE); Michael Donoser, Berlin (DE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 401 days.

(21) Appl. No.: 16/162,007

(22) Filed: Oct. 16, 2018

(51) Int. Cl.
| G06K 9/62 | (2022.01) |
| G06F 3/04812 | (2022.01) |
| G06F 3/0484 | (2022.01) |
| G06V 10/20 | (2022.01) |
| G06V 30/10 | (2022.01) |

(52) U.S. Cl.
CPC ......... *G06K 9/6262* (2013.01); *G06F 3/0484* (2013.01); *G06F 3/04812* (2013.01); *G06V 10/20* (2022.01); *G06V 30/10* (2022.01)

(58) Field of Classification Search
None
See application file for complete search history.

(56) References Cited

U.S. PATENT DOCUMENTS

| 9,025,811 | B1 * | 5/2015 | Ioffe | G06F 16/5838 |
| | | | | 382/100 |
| 9,721,008 | B1 * | 8/2017 | Byron | G06F 40/284 |
| 9,875,258 | B1 * | 1/2018 | Hsiao | G06F 16/5846 |
| 10,372,979 | B1 * | 8/2019 | Walker | H04N 1/0066 |
| 2012/0128250 | A1 * | 5/2012 | Petrou | G06K 9/036 |
| | | | | 382/182 |
| 2013/0273968 | A1 * | 10/2013 | Rhoads | H04W 4/50 |
| | | | | 455/556.1 |
| 2013/0290857 | A1 * | 10/2013 | Beveridge | G06F 3/0484 |
| | | | | 715/740 |
| 2014/0068471 | A1 * | 3/2014 | Wu | G06F 3/0485 |
| | | | | 715/764 |
| 2016/0328383 | A1 * | 11/2016 | Cross, III | G06F 40/211 |
| 2016/0328386 | A1 * | 11/2016 | Cross, III | G06F 16/36 |
| 2018/0089315 | A1 * | 3/2018 | Seiber | G06F 16/68 |

OTHER PUBLICATIONS

Bai, Yalong, et al. "Bag-of-words based deep neural network for image retrieval." Proceedings of the 22nd ACM international conference on Multimedia. 2014. (Year: 2014).*
Grech, Matthew. Image Classification using Bag of Visual Words and Novel COSFIRE Descriptors. Diss. University of Malta, 2016. (Year: 2016).*

* cited by examiner

*Primary Examiner* — Andrae S Allison
(74) *Attorney, Agent, or Firm* — K&L Gates LLP

(57) ABSTRACT

Techniques are generally described for predicting text relevant to image data. In various examples, the techniques may include receiving image data comprising a first portion. The first portion of the image data may correspond to a first plurality of pixels when rendered on the display. Text data comprising a first text related to the first portion of the image data may be received. A first vector representation of the first portion of the image data may be determined. In some examples, a correspondence between the first portion of the image data and the first text may be determined based at least in part on the first vector representation. A first identifier of the first portion of image data may be stored in a data structure in association with a second identifier of the first text.

20 Claims, 11 Drawing Sheets

RELEVANT TEXT IDENTIFICATION BASED ON IMAGE FEATURE SELECTION

BACKGROUND

Graphical user interfaces (GUIs) are often used to display graphics, photographs and/or other images representing physical and/or digital objects. In many cases, the depiction of the objects is associated with text describing and/or discussing the objects. Often, depending on the object and the context there may be several pages of text related to different components of the object. For example, each component of the object depicted may be associated with a textual description of the function and/or characteristics of that component. In some examples, associations may be formed between a component of an image and text relevant to that image by inserting a link into a web-based markup language such as hypertext markup language (HTML). Thereafter, a user may click on a link and/or a linked portion of an image to be redirected to different data associated with the link.

Provided herein are technical solutions to improve graphical user interfaces and determination of related content.

DETAILED DESCRIPTION

Figure 1:
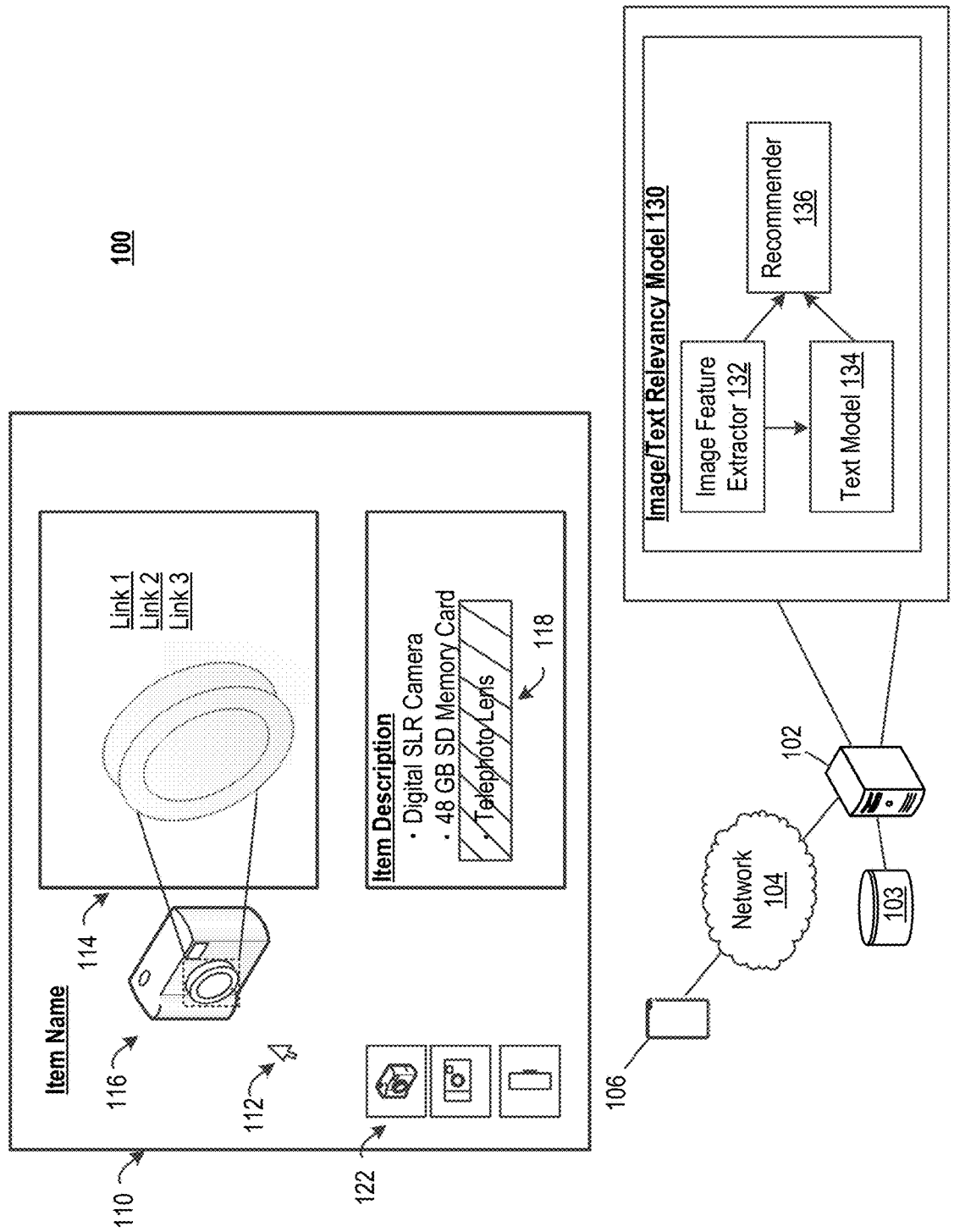
FIG. 1 depicts a system for prediction of relevant text based on image feature selection, in accordance with various embodiments of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, graphical user interfaces may be used to display content accessible by one or more computing devices. In some examples, graphical user interfaces may display an image of an object. The image may be a digital representation of the object that may be rendered on a display so that a user may view the representation of the object. The image may be, for example, a photograph or an artistic rendering of the object. Text may be present and may describe or otherwise be associated with various components of the displayed object.

For example, a picture may represent a combustion engine used to power automobiles. Text may describe the function of various components of the engine. For example, the text may describe the function of a piston of the engine and/or a cylinder in which the piston is disposed. Additionally, the text may describe common problems associated with various parts of the engine. For example, the text may describe a gasket that may fail after prolonged use. Text may describe specifications of various components. Using the example above, text may describe dimensions of a cylinder, the volume of the cylinder, an identification and description of a material from which the cylinder is formed, etc. The text may further include user comments about various components of the displayed object. Users may ask questions, describe aspects of the object, and/or debate ideas related to the object. For example, users may describe how to install a piston in the engine or a user may recommend a particular spark plug to use with the depicted engine, etc.

In various examples, the amount of text that may be associated with a particular object may exceed (or even far exceed) the amount of text that can be displayed on screen at a given time, at least in a font size that is easily readable by a user. Accordingly, in some examples, a user may be forced to navigate through the page by scrolling, searching, or otherwise maneuvering within the text to find a portion of the text relevant to the user's particular interest. In some cases, a text search tool may be incapable of providing the relevant text either because the user is unsure of the particular terminology used to describe the component of interest and/or because the relevant text may be located on a different webpage or graphical user interface other than the page that is currently displayed. In at least some additional examples, the user may be unsure of what text may be related to a particular component of interest or area of the visual image data and may therefore be unable to perform a text search.

In an example, a particular object may have user reviews associated with the object. However, a user may be interested in the reliability of a particular component of the object. There may be several navigable pages (e.g. tens or hundreds of navigable pages) of user reviews or other pages of text associated with the object. In an example, 4 user reviews out of the many navigable pages of user reviews may relate to the particular component of interest to the user. The 4 reviews may be located on pages 16, 18, 83, and 92. Accordingly, the user may be required to navigate through multiple pages and may even be required to read each review or each entry in order to find text relevant to the component of interest. Such an endeavor can be extremely time consuming and frustrating, and may obfuscate information relevant to the user's search due to the sheer volume of text that the user may be required to parse in order to reach the relevant information.

It is possible to manually annotate and/or link various components of an image to text that is relevant to that image. For example, a depiction of a human skeleton may have each bone labeled with a number. A web-based markup language, such as HTML, may be used to embed a link in each number, or within the image itself. The link may cause the browser to display information relevant to the particular reference number and/or bone. In an example, a link may be included in reference to the portion of the image representing the clavicle. Thereafter, if a user clicks on the clavicle, text may be provided to name and/or describe the clavicle. In various examples, the text may be provided in a pop-up text box, or the link may cause a browser function or other GUI function to navigate to and/or highlight the relevant text.

Although, it is possible to manually annotate and link text information to relevant components of an image, it is a time consuming and manual process. Additionally, because many web services allow users to publish their own text and content to the GUI, an administrator of a web service would be required to constantly check for new user published content in order to determine to what portions of a displayed image a new comment from a user relates and then add a hyperlink (or the like) to link the text to the relevant portion of the image. The various techniques described below, provide improvements over existing GUIs by identifying contextually relevant textual data based on a user's interaction with an image and presenting such contextually relevant textual data to a user in an easily digestible format, without requiring the association between the image data and the text data to be manually coded into the markup language of the GUI.

Accordingly, described herein are techniques that may be used to automatically determine relevant text associated with various image components. Additionally, the various techniques described herein may automatically determine a plurality of features of an image. For each feature of an image, the techniques described herein may determine whether or not a correlation exists between the image feature and text associated with the image. Correlations between image features and text may be stored in a lookup table. In various examples described herein, the correlations may take the form of a relevancy score for text output by a machine learning model trained to identify the most contextually relevant text to a particular portion of image data. Thereafter, if a user clicks on and/or hovers a cursor or other input tool over a particular image feature (e.g., a portion of image data), a lookup may be performed to determine portions of the text associated with the image feature. The relevant portions of text may be provided to the user in a variety of ways, as described in further detail below. In accordance with various techniques described herein, associations between image features and text relevant to the image features may be automatically provided without requiring manual embedding of links in a web-based markup language of a webpage associated with the image and/or the relevant text. In various examples, the relevant text may be aggregated together into a combined form that may be more easily digestible for a user.

Improved GUIs are described herein that allow a user to click on, hover over, or otherwise provide an input indicating an interest in a particular image feature of an image rendered on the GUI. In response to the input, text identified as relevant to that image feature and/or likely to be of interest to the user may be provided to the user to provide an improved user experience and/or to provide information through the GUI that may otherwise be obfuscated and/or "buried" within a large amount of text.

FIG. 1 depicts a system 100 for prediction of relevant text based on image feature selection, in accordance with various embodiments of the present disclosure. System 100 may include computing device(s) 102 that may be accessible over a network 104. Computing device(s) 102 may comprise at least one processor and a non-transitory computer readable memory 103. In various examples, the non-transitory computer readable memory 103 may store instructions that when executed by the at least one processor of computing device(s) 102 may program the computing device(s) 102 to perform one or more of the computer-implemented techniques described in further detail below.

Computing device(s) 102 may be effective to predict relevant text based on image feature selection, as described herein. Additionally, in various examples, computing device(s) 102 may perform web hosting and/or web service duties and/or may be configured in communication with one or more computing devices that perform web hosting and/or web service duties. For example, computing device(s) 102 may provide a web page that comprises a graphical user interface (GUI) 110. Various computing devices may access and display graphical user interface 110. For example, mobile computing device 106 may access graphical user interface 110. In this example, graphical user interface 110 may be a user interface of a web-based application executing on mobile computing device 106. In addition, the web-based application may communicate over network 104 with computing device(s) 102. In various other examples, graphical user interface 110 may be provided by a web page displayed on a web browser that may be executing on a desktop computing device, a mobile computing device, or any other type of computing device associated with a display. Network 104 may be, for example, a wide area network (e.g., the Internet) or a local area network.

In the example, graphical user interface 110 may display images of objects. For example, graphical user interface 110 may display an image representing a camera 116. A user may use a cursor 112 (e.g., a mouse pointer) and/or another type of cursor to click on and/or select various elements in graphical user interface 110. In various other examples, graphical user interface 110 may be displayed on a touch screen display. In such examples, no cursor 112 may be present. In some examples, different viewpoints of the object may be available for viewing. For example, thumbnails 122 representing different viewpoints of camera 116 are depicted in FIG. 1. In various examples, clicking on a particular thumbnail 122 may cause a larger image of the camera 116 to be shown from the perspective depicted in the thumbnail 122. For example, in FIG. 1, a user of the graphical user interface 110 may have selected the top-most thumbnail 122 depicting an isometric view of the camera 116.

In at least some examples, by hovering cursor 112 over one or more pixels representing camera 116, an enlarged image of the relevant portion of camera 116 may be shown. For example, in FIG. 1, a user may have hovered cursor 112 over the lens of camera 116. In different examples using a touch screen display, a user may have touched or otherwise selected a portion of the image of camera 116 for enlarging. Accordingly, an enlarged view of the lens is shown in enlarged image 114.

Images displayed on the graphical user interface 110 may be associated with text. For example, camera 116 may be associated with an item description and/or one or more reviews of camera 116 and/or components and/or accessories thereof. As described in further detail below, an image/text relevancy model 130 may be used to automatically form associations between portions of an image and text that is relevant to those portions of the image. Such associations may be stored in memory 103 and may be used to automatically link and/or "surface" relevant text data when a user interacts with a particular portion of the image. Surfacing of relevant text may include causing GUI 110 to navigate to the relevant text, highlighting the relevant text, causing the relevant text to be displayed prominently on the current screen, providing navigation tools (e.g., selectable graphical elements such as buttons) to cycle through different portions of relevant text, or the like.

In FIG. 1, image/text relevancy model 130 may have previously generated associations between various portions of the image of camera 116 and text related to the different portions of the image of camera 116. For example, a user may hover cursor 112 (or may otherwise select) over the lens of camera 116. Computing device 102 and/or another computing device providing graphical user interface 110 may use a lookup operation to determine whether the selected portion of the image (e.g., the lens) is associated with any relevant text. The lookup table, or other data structure, may be populated using image/text relevancy model 130, described in further detail below. Image/text relevancy model 130 may automatically generate instructions that may cause the relevant text to be surfaced (e.g., prominently provided on screen) upon user interaction with the portion of the image, as described herein.

Computing device 102 or another computing device providing graphical user interface 110 may determine the text associated with the selected portion of the image (e.g., the lens) as indicated in the lookup table or other data structure (e.g., a relational or graphical database). Relevant text associated with the selected portion of the image may be highlighted. For example, upon detecting user interaction with the lens of camera 116, text 118 may be highlighted which describes that the lens of camera 116 is a telephoto lens. In various other examples, text may be imported into the area of the graphical user interface 110 showing the enlarged image. For example, Link 1, Link 2, and Link 3 may be provided in the enlarged image 114. Selection of Link 1, Link 2, and/or Link 3 may cause the graphical user interface 110 to navigate to an area where text relevant to the lens of camera 116 is displayed. In another example, the relevant text itself may appear in a prominent area of graphical user interface 110 (such as within or near enlarged image 114). In another example, one or more selectable graphical elements may be provided on GUI 110. Selection of the selectable graphical elements may generated data inputs that may, in turn, be effective to cause GUI 110 to navigate to an area where text relevant to the lens of camera 116 is displayed and may cause highlighting or other emphasis to be placed on the relevant text.

In at least some examples, portions of the image and/or the enlarged image may be highlighted when those portions of the image are associated with various portions of the text. In at least some examples, portions of the image may appear partially transparent, shaded, and/or may be highlighted with a particular color to indicate that the highlighted portion of the image is associated with contextually relevant text. Various other visual queues apart from coloring, shading, and transparency may also be used to indicate that a portion of an image is associated with contextually relevant text, according to the desired implementation.

Image/text relevancy model 130 may be a machine learning model effective to determine associations between image data and text data. In various examples, image/text relevancy model 130 may comprise an image feature extractor 132 and/or a text model 134. Image feature extractor 132 may be effective to generate feature representation vectors representing portions of an image (e.g., visual feature vectors). In various examples, the feature representation vectors may be a numerical representation of a portion of the image and may include semantic information describing, identifying, and/or categorizing the portion of the image. As described in further detail below, in some examples, contextual metadata associated with various images may be used to extract feature representation vectors representing a portion of the image. For example, particular details concerning a depicted object may be known and encoded in metadata associated with the image of the object (or a portion thereof). For example, if a black shoe is depicted, metadata details related to the shoe (or portions thereof) may include "black", "shoe", "buckle", etc. Image feature extractor 132 may use such metadata as inputs, along with the image data itself and may generate visual feature vectors representing portions of the image. Similarly, text model 134 may be effective to generate feature representation vectors representing words and/or sentences of input text data (e.g., textual feature vectors). The feature representation vectors representing text may be a numeric representation of a semantic interpretation of the text.

In some examples, recommender 136 may form associations (e.g., determine a correspondence) between portions of input image data and portions of input text data. For example, recommender 136 may be effective to compare feature representation vectors generated by image feature extractor 132 and feature representation vectors generated by text model 134. When a feature representation vector representing a portion of an image corresponds closely (e.g., within a tolerance level such as 2%, 3.5%, 5%, 10% or any suitable tolerance level for the desired application) with a feature representation vector representing text (e.g., a sentence), recommender 136 may store an association between the portion of the image and the text in a lookup table or other data structure. In various examples, image/text relevancy model 130 may automatically generate a link (e.g., a hypertext link of a markup language used to display the graphical user interface 110) associated with the portion of the image and/or with the portion of the text such that when a user clicks on, hovers over, selects, or otherwise indicates an interest in the portion of the image the text is made available to the user on the graphical user interface 110 (e.g., by highlighting, providing pop-up text, providing a link, or the like).

Image/text relevancy model 130 may be used to automatically generate graphical user interface 110 and may automatically generate associations (e.g., links) between portions of displayed images and text relevant to the different portions of the displayed images. In various examples, separately extracting visual features for portions of image data and textual features for portions of text may be suboptimal. Accordingly, machine learning models of image/text relevancy model 130 may be trained to learn to extract features in the text domain and image data domain together.

In some examples, instead of generating feature vectors representing image data and feature vectors representing text data and determining correspondence between the vectors in order to identify relevant text, a combined model may be used. In an example of a combined model, a visual feature vector corresponding to a portion of an image may be used to initialize a machine learning model of image/text relevancy model 130 that may be trained to determine the words, sentences, paragraphs, and/or pages of text that are most relevant to the visual feature represented by the visual feature vector. In other words, after generating a visual feature vector representing a portion of an image, the identification of text relevant to the portion of the image may be conditioned on the input visual feature vector. As described in further detail below, a recurrent neural network comprising one or more hidden layers may be trained to determine the relevancy of text to a particular visual feature vector that has been used to initialize the recurrent neural network. In various examples, text model 134 may represent the machine learning model trained to receive an input visual feature vector and may output relevancy scores describing the relevancy of different portions of text to the input visual feature vector. A relevancy score may represent a quantifiable confidence value indicating how relevant a particular portion of text data is to the visual feature vector representing a portion of image data.

In various examples, recommender 136 may form the associations between portions of input image data and portions of input text data by identifying the portions of text with the highest relevancy scores for the particular visual feature vector. In various examples, recommender 136 may use recursive techniques to identify the portions of text that are most likely to be relevant to a particular portion of image data. For example, recommender 136 may first determine the most relevant words of the text data (e.g., the words with the highest relevancy scores) for a particular input visual feature vector using a recursive neural network trained to generate relevancy scores for words based on an input visual feature vector. Thereafter, the most relevant words and/or the visual feature vector may be used to initialize a second machine learning model trained to identify relevancy scores for sentences of text data to identify the sentences that are most relevant to the visual feature vector, and so on.

In various examples, to train image/text relevancy model 130, an annotated dataset may be provided. In various examples, the annotated dataset may comprise bounding boxes on images (or groupings of one or more pixels of the images), along with corresponding segments of text related to the bounding boxes (or to the grouping of one or more pixels). In some examples, bounding boxes and/or groupings of pixels may be overlapping. For example, a bounding box associated with a side view of a shoe may overlap with a bounding box surrounding a logo shown on the side of the shoe. In some other examples, image/text relevancy model 130 may comprise one or more unsupervised learning models effective to learn correlations between image data and text data without labeled training data.

In at least some examples, one or more convolutional neural networks (CNNs) may be used to extract visual features from image data (e.g., feature representation vectors generated by image feature extractor 132) and/or from contextual metadata related to and/or describing portions of the image data. Accordingly, the image feature extractor 132 may comprise a CNN, in some examples. Additionally, in some further examples, text model 134 may comprise a recurrent neural network (RNN). In various examples, the RNN may include one or more long short term memory (LSTM) units capable of learning long term dependencies in text, neural attention models, CNNs with causal convolutions, etc. In various examples, recommender 136 may determine an association between a visual feature vector extracted from an image and a textual feature vector extracted from text by determining a Euclidean distance, cosine distance, and/or by using any other distance function to determine a distance between a textual feature vector and a visual feature vector. If the two vectors correspond to within a threshold tolerance level, a determination may be made that the portion of the image represented by the visual feature vector and the portion of text represented by the textual feature vector are associated. Additionally, as previously described, a combined model may be used wherein relevancy scores of text may be determined based on an input visual feature vector without extracting textual feature vectors. An association between the portion of the image and the relevant portion(s) of the text may be stored in a lookup table or other data structure. Image/text relevancy model 130 may generate code effective to provide the relevant text, or an indication of the relevant text, when the user interacts with the relevant portion of the image data, as described herein.

Figure 2:
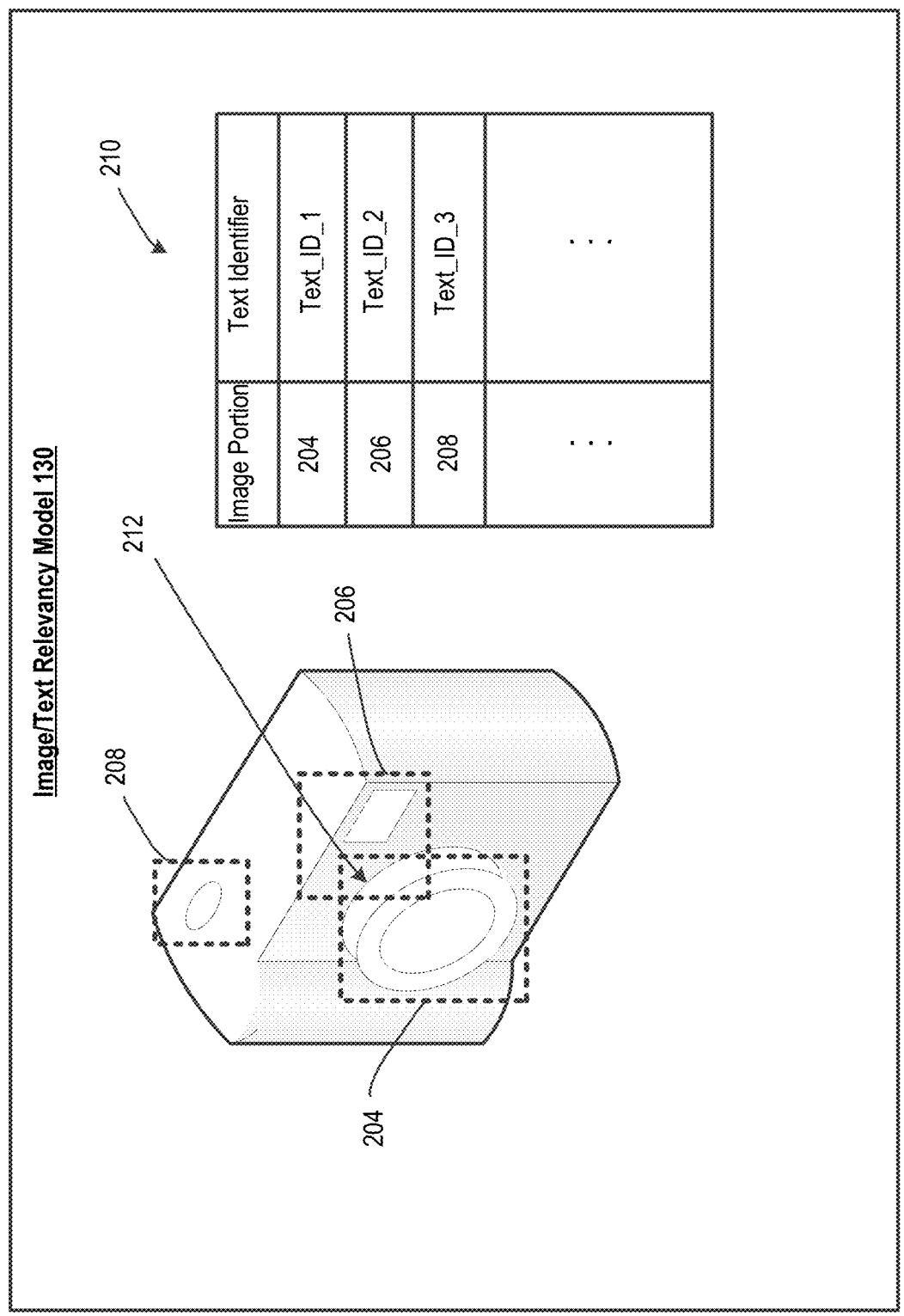
FIG. 2 depicts association of portions of image data with relevant text in a data structure, in accordance with various embodiments of the present disclosure.

FIG. 2 depicts association of portions of image data with relevant text in a data structure, in accordance with various embodiments of the present disclosure. As shown in FIG. 2, image/text relevancy model 130 may determine one or more portions of image data that are associated with one or more portions of text. In the example depicted in FIG. 2, bounding boxes 204, 206, and 208 have been determined. Bounding boxes 204, 206, and 208 may each identify a portion of the camera that is relevant to text provided by the graphical user interface (e.g., GUI 110 of FIG. 1). Additionally, bounding boxes 204 and 206 overlap in overlap area 212. Bounding box 204 may be a grouping of pixel addresses that include image data representing the lens of the camera. Bounding box 206 may be a grouping of pixel addresses that include image data representing the flash of the camera. Bounding box 208 may be a grouping of pixel addresses that include image data representing a button of the camera. Overlap area 212 may be a grouping of pixels addresses that includes image data partly displaying the lens of the camera and partly displaying a front surface of the camera. Although bounding boxes are shown in FIG. 2 by way of example, individual pixel addresses may instead be used.

Image/text relevancy model 130 may determine an association between the relevant portions of image data (e.g., the image data of bounding boxes 204, 206, and/or 208) and corresponding portions of text and may store the association in lookup table 210. For example, image/text relevancy model 130 may determine, based on a correlation between a visual feature vector representing the lens of the camera and a textual feature vector representing a word or words describing the lens of the camera, an association between the portion of the image data representing the lens and the word or words describing the lens. In various other examples, image/text relevancy model 130 may determine relevancy scores representing the relevancy of portions of text to the image data included within one or more bounding boxes (and/or groupings of pixels). In the example depicted in FIG. 2, the association may be stored in lookup table 210 by storing the indication of the bounding box 204 (which may include location data indicating the size and location address of the bounding box) in association with a text identifier identifying the relevant text associated with the lens (e.g., Text_ID_1). In various examples, when training image/text relevancy model 130, multiple input hypotheses may be used for portions of image data comprising multiple bounding boxes and/or groupings of pixels. For example, for overlap area 212, visual feature vectors for both bounding boxes 206 and 204 may be used to determine relevancy scores for text.

In an example, image/text relevancy model 130 may determine that a visual feature vector representing the flash of the camera may be associated with a word or words describing the flash of the camera, as the word or words may have a high relevancy score (e.g., above a relevancy score threshold). In the example depicted in FIG. 2, the association may be stored in lookup table 210 by storing the indication of the bounding box 206 (which may include location data indicating the size and location address of the bounding box) in association with a text identifier identifying the relevant text associated with the flash (e.g., Text_ID_2). In various examples, the relevancy scores may be stored in lookup table 210 is association with the image portion and the text identifier. In some other examples, lookup table 210 may store associations only for text that has been determined to be sufficiently relevant (e.g., above a threshold relevancy score) to the image portion. Further, in some examples, the text identifiers of lookup table 210 may represent aggregated text generated by image/text relevancy model 130. Aggregated text may include an aggregation of the most relevant text to a particular image portion. For example, for bounding box 206, image/text relevancy model 130 may aggregate a first sentence, "Night images are lousy," a second sentence, "Leaving the flash in auto mode quickly drains the battery," and a third sentence "The flash is great!".

Similarly, image/text relevancy model 130 may determine that a visual feature vector representing the button of the camera may be associated with a word or words describing the button of the camera, as the word or words may have a high relevancy score. Lookup table 210 may store an association between the portion of the image data representing the button and the word or words with the highest relevancy scores. In the example depicted in FIG. 2, the association may be stored in lookup table 210 by storing the indication of the bounding box 208 (which may include the size and location address of the bounding box) in association with a text identifier identifying the location of the relevant text associated with the button (e.g., Text_ID_3).

Image/text relevancy model 130 may generate code used to cause the GUI (e.g., GUI 110 of FIG. 1) to surface the relevant text when the user interacts with the relevant portion of the image. For example, a user may hover a mouse pointer over a portion of the image data within bounding box 204. Image/text relevancy model 130 or computing device(s) 102 (FIG. 1) may perform a lookup of lookup table 210 to determine that bounding box 204 is associated with Text_ID_1. For example, a pixel address associated with the current location of the mouse pointer may be used as a search input to lookup table 210. A determination may be made that the pixel address is associated with image portion 204 (e.g., the lens). Text_ID_1 may identify the relevant portions of text describing the lens. For example, Text_ID_1 may provide the locations and/or addresses of the text as rendered on the GUI. Thereafter, image/text relevancy model 130 or computing device(s) 102 may cause the GUI 110 (FIG. 1) to highlight the relevant text, display the relevant text in a designated portion of the GUI, navigate to the relevant text, etc., in accordance with a desired implementation. In at least some examples, where GUI 110 is provided by a browser, image/text relevancy model 130 or computing device(s) 102 may provide instructions executable by the browser to cause the GUI 110 to perform the relevant actions (e.g., navigating to the text, highlighting the text, etc.) related to providing the relevant text.

Figure 3A:
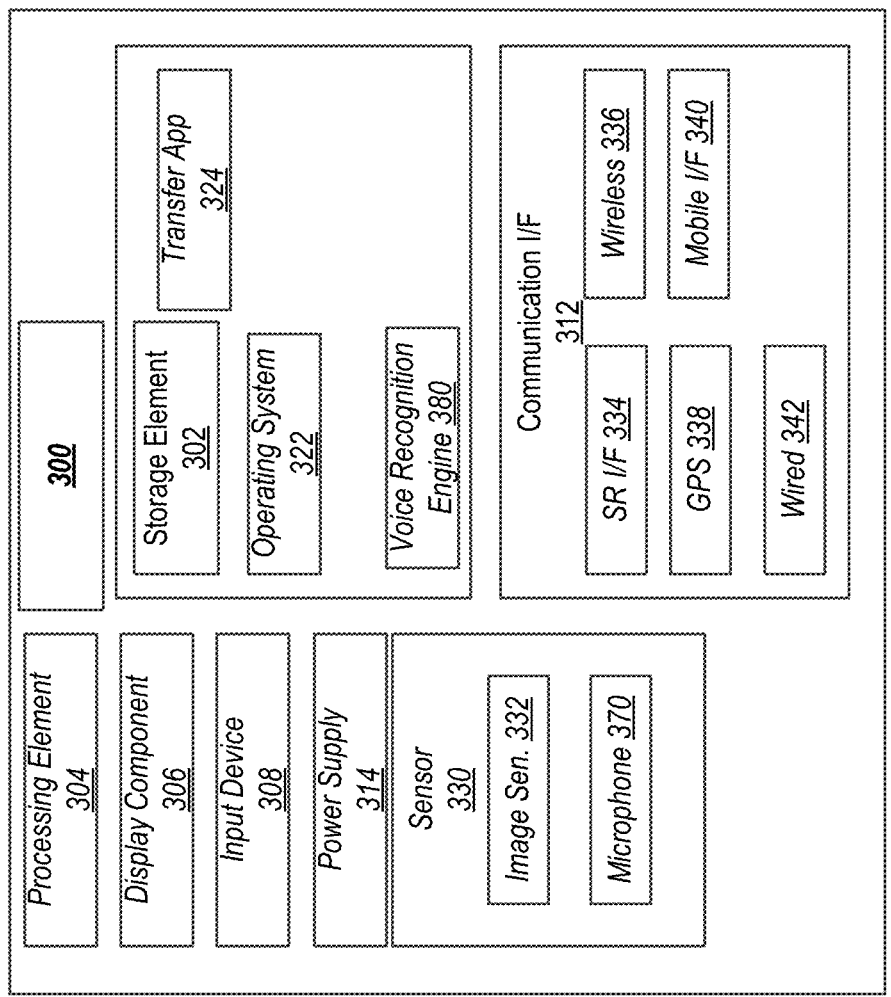
FIGS. 3A-3B are block diagrams showing example architectures of a computing device that may be used in accordance with various techniques described herein.

FIG. 3A is a block diagram showing an example architecture of a computing device that may be used in accordance with various techniques described herein.

It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs) and/or image signal processors (ISPs). In some examples, the processing element 304 may be effective to filter image data into different frequency bands, as described above. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to receive images and/or video from another device (e.g., a mobile device, image capture device, and/or display device) or from an image sensor 332 included in the architecture 300. In some examples, the transfer application 324 may also be configured to upload the received images to another device that may perform processing as described herein.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples where architecture 300 represents image/text relevancy model 130 (shown in FIG. 1), mobile interface 340 may allow image/text relevancy model 130 to communicate with one or more other computing devices such as computing device(s) 102.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Figure 3B:
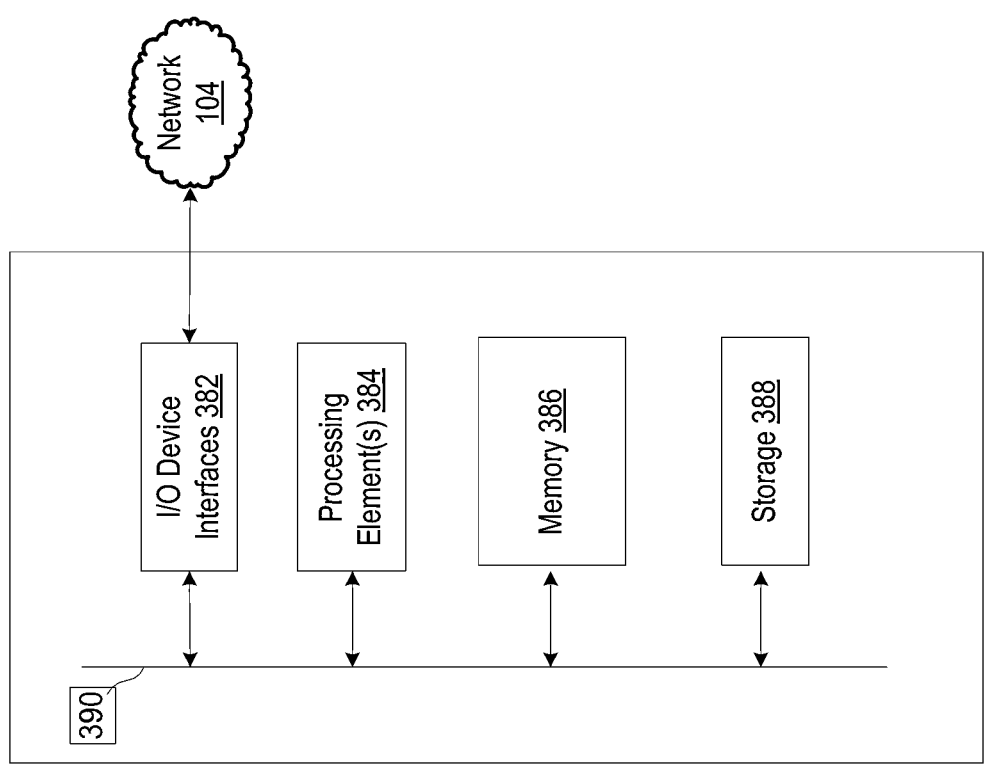

FIG. 3B is a block diagram conceptually illustrating example components of a remote device, such as the computing device(s) 102, which may execute, in whole or in part, image/text relevancy model 130. In operation, each computing device 102 (or groups of devices) may include computer-readable and computer-executable instructions that reside on the respective device, as will be discussed further below.

Each of these devices (e.g., computing device(s) 102) may include one or more controllers/processors 384, which may each include at least one central processing unit (CPU) for processing data and computer-readable instructions, and a memory 386 for storing data and instructions of the respective device. The memories 386 may individually include volatile random access memory (RAM), non-volatile read only memory (ROM), non-volatile magnetoresistive memory (MRAM), and/or other types of memory. Each computing device may also include a data storage component 388 for storing data and controller/processor-executable instructions. Each data storage component 388 may individually include one or more non-volatile storage types such as magnetic storage, optical storage, solid-state storage, etc. Each computing device may also be connected to removable or external non-volatile memory and/or storage (such as a removable memory card, memory key drive, networked storage, etc.) through respective input/output device interfaces 382. In various examples, one or more caches used to store redundant contextual query data may be stored in a cache of memory 386.

Computer instructions for operating each computing device and its various components may be executed by the respective device's controllers/processors 384, using the memory 386 as temporary "working" storage at runtime. A device's computer instructions may be stored in a non-transitory manner in non-volatile memory 386, storage 388, or an external device(s). Alternatively, some or all of the executable instructions may be embedded in hardware or firmware on the respective device in addition to or instead of software.

Each computing device includes input/output device interfaces 382. A variety of components may be connected through the input/output device interfaces 382, as will be discussed further below. Additionally, each computing device may include an address/data bus 390 for conveying data among components of the respective device. Each component within a computing device may also be directly connected to other components in addition to (or instead of) being connected to other components across the bus 390.

As noted above, multiple devices may be employed in a single system. In such a multi-device system, each of the devices may include different components for performing different aspects of the system's processing. The multiple devices may include overlapping components. The components of the computing device(s) 102 and/or the image/text relevancy model 130, as described herein, are exemplary, and may be located as a stand-alone device or may be included, in whole or in part, as a component of a larger device or system.

Figure 4A:
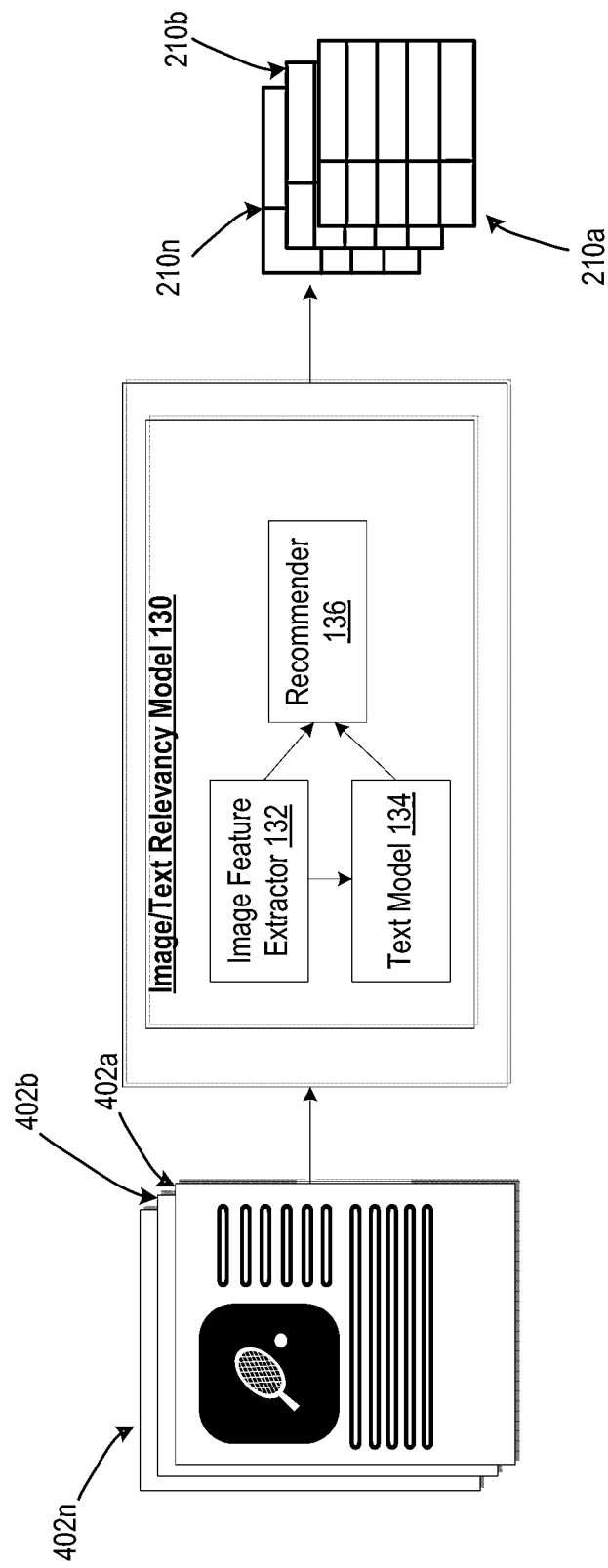
FIG. 4A depicts a system that may be used to predict relevant text based on image feature selection, in accordance with embodiments of the present disclosure.

FIG. 4A depicts a system that may be used to predict relevant text based on image feature selection, in accordance with embodiments of the present disclosure. As depicted in FIG. 4A, a plurality of images and associated text may be input to image/text relevancy model 130. In the example of FIG. 4A, the input images and associated text may be web pages, digital documents, digital objects, etc., (and are referred to hereinafter in FIG. 4A as "documents"). As shown, documents 402a, 402b, . . . , 402n are provided to image/text relevancy model 130. In various examples, documents 402a, 402b, . . . , 402n may be a catalog of images and associated text.

Image feature extractor 132 may use computer vision techniques and machine learning techniques (as described herein) to generate visual feature vectors representing different portions of the image for each image in each of documents 402a, 402b, . . . , 402n. Accordingly, document 402a may include one or more pictures of a sandal. Image feature extractor 132 may generate different feature vectors representing different portions of the sandal. Additionally, image feature extractor 132 may identify the portion of the image of the sandal associated with the feature vector (e.g., using a bounding box and/or pixel-based identification). For example, image feature extractor 132 may generate a first visual feature vector representation of a buckle of the sandal, a second visual feature vector representation of the sole of the sandal, etc. Additionally, in at least some examples, image feature extractor 132 may communicate with text model 134 such that only those portions of the image with related textual data are identified and used to generate visual feature vectors. For example, if no textual data is related to a particular strap of the sandal, no visual feature vector may be generated for the strap. In some further examples, multiple visual feature vectors may be generated for some portions of image data. For example, a mouse pointer may be hovered above a logo depicting a side view of a shoe. A first visual feature vector may be generated that represents the logo and a second visual feature vector may be generated that represents the side of the shoe.

In some examples, text model 134 may generate different feature vectors representing different portions of the text. Additionally, text model 134 may identify a location within the document (or documents) of the relevant text. For example, text model 134 may generate a first textual feature vector representation of text describing the buckle of the sandal, a second textual feature vector representation of the sole of the sandal, etc. Additionally, in at least some examples, textual feature extractor 134 may communicate with image feature extractor 132 to determine textual data that is relevant to visual feature vector representations identified by image feature extractor 132. For example, if textual data is unrelated any portions of the image, no textual feature vector representation of the text may be generated. In other examples, text model 134 may not extract feature vectors representing different portions of the text, but may generate relevancy scores for different portions of the text based on an input visual feature vector. Further, text model 134 may identify locations within the document or documents of the relevant text (e.g., the portions of the text with the highest relevancy scores or the portions of text with relevancy scores above a relevancy threshold).

In some examples, recommender 136 may compare the visual feature vectors and the textual feature vectors to determine a correspondence between visual feature vectors and textual feature vectors. For example, recommender 136 may determine a distance, in the feature space, between the visual feature vectors and the textual feature vectors. If a particular textual feature vector corresponds to a particular visual feature vector within a tolerance level, an association may be formed and stored in a lookup table 210 that is associated with the particular document(s). In other examples recommender 136 may identify the text with high relevancy scores (e.g., text with a relevancy score above a relevancy threshold) for a particular input visual feature vector. An association may be generated and stored in a lookup table 210 that is associated with the particular document(s). As previously described, in various examples, relevant text may be aggregated (e.g., the most relevant portions may be combined into a summary or the like) and an identifier of the aggregated text may be stored in the lookup table 210 in association with the visual feature vector. In various examples, a first document or group of documents 402a may correspond to a first lookup table 210a storing associations for the first document or group of documents 402a. GUI 110 (FIG. 1) may be effective to determine associations between portions of an image identified in lookup table 210a and the related text identified in lookup table 210a. In various examples, the text may be aggregated from those portions of text with the highest relevancy scores. Accordingly, when a user interacts with the portion of the image, the GUI 110 may determine the relevant text stored in lookup table 210a and may execute one or more instructions effective to cause the text to be highlighted, prominently displayed, navigated to, etc. Each document (or group of documents) 402a, 402b, ..., 402n may be associated with a respective lookup table (or other data structure) 210a, 210b, ..., 210n.

Figure 4B:
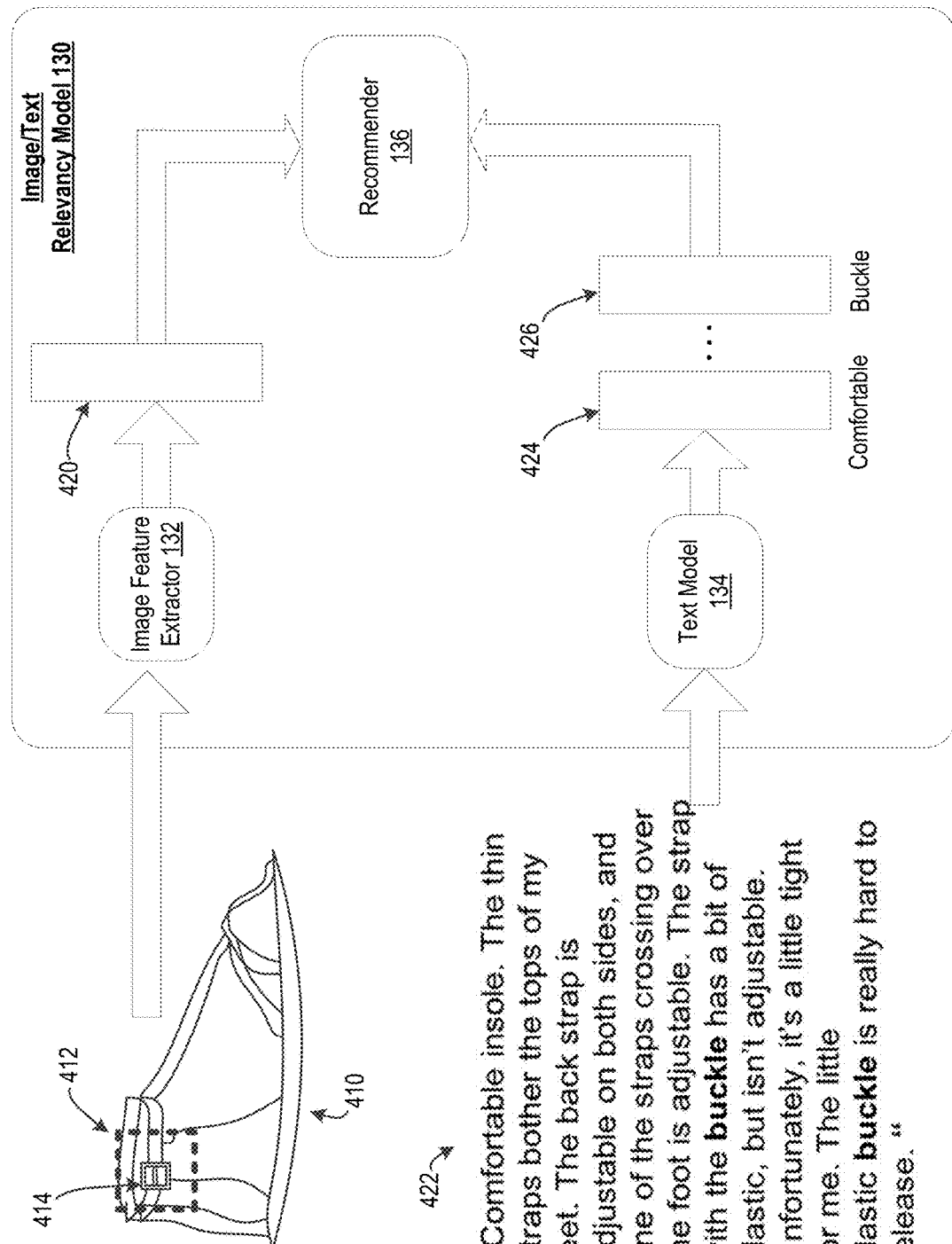
FIG. 4B depicts an example of an image/text relevancy model that may be used in accordance with various aspects of the present disclosure.

FIG. 4B depicts an example of image/text relevancy model 130 that may be used in accordance with various aspects of the present disclosure. In the example, image data 410 and text data 422 may be received by image/text relevancy model 130. Although depicted in FIG. 4B as within a single box, functions of image/text relevancy model may be performed by multiple computing devices configured in communication with one another. In still other examples, a single computing device may be effective to perform the various functions of image/text relevancy model 130.

In the example shown in FIG. 4B, image data 410 depicts a sandal including a buckle 414 to fasten straps of the sandal. In various examples, a computer vision algorithm (e.g., an object detection algorithm) may be used to determine various portions of the image data 410 representing different objects. In an example, the computer vision algorithm may be effective to draw a bounding box around the various different portions identified. Accordingly, a bounding box 412 may be used to identify buckle 414. The bounding box 412 and the image data included in the bounding box 412 (e.g., the pixels representing buckle 414) may be provided to image feature extractor 132. In various examples, although depicted separately in FIG. 4B, the computer vision techniques used to identify different portions of the image data and/or generate bounding boxes or groupings of pixels may be a part of image feature extractor 132. As previously described, image feature extractor 132 may be effective to generate a visual feature vector semantically describing the portion of the image identified by bounding box 412. For example, a machine learning model 420 comprising one or more layers may be trained to generate visual feature vectors based on image data.

Text data 422 may be related to image data 410. In the example depicted in FIG. 4B, text data 422 describes buckle 414 of the depicted sandal. The text data 422 may be sent to text model 134. Text model 134 (e.g., including hidden layers 424 and 426) may generate a per-word relevancy score for each word of text data 422. As described in further detail in reference to FIG. 4C, recommender 136 may generate word relevancy scores, sentence relevancy scores, and/or paragraph relevancy scores in order to identify the most relevant text to buckle 414. In various examples, the visual feature vector generated for bounding box 412 and buckle 414 may be provided to text model 134 and may be used to initialize a recurrent neural network used to generate the per-word relevancy scores. Accordingly, the relevancy scores of the various words may be conditioned on the image of the buckle represented by the visual feature vector.

Additionally, in some examples, text model 134 may generate text feature vectors representing one or more portions of text data (e.g., on a per-word, per-sentence, per-paragraph, or other suitable basis). In such examples, recommender 136 may be effective to compute the distance between the text feature vectors and the visual feature vector to determine the most relevant text to the portion of the image data (e.g., the buckle 414).

Figure 4C:
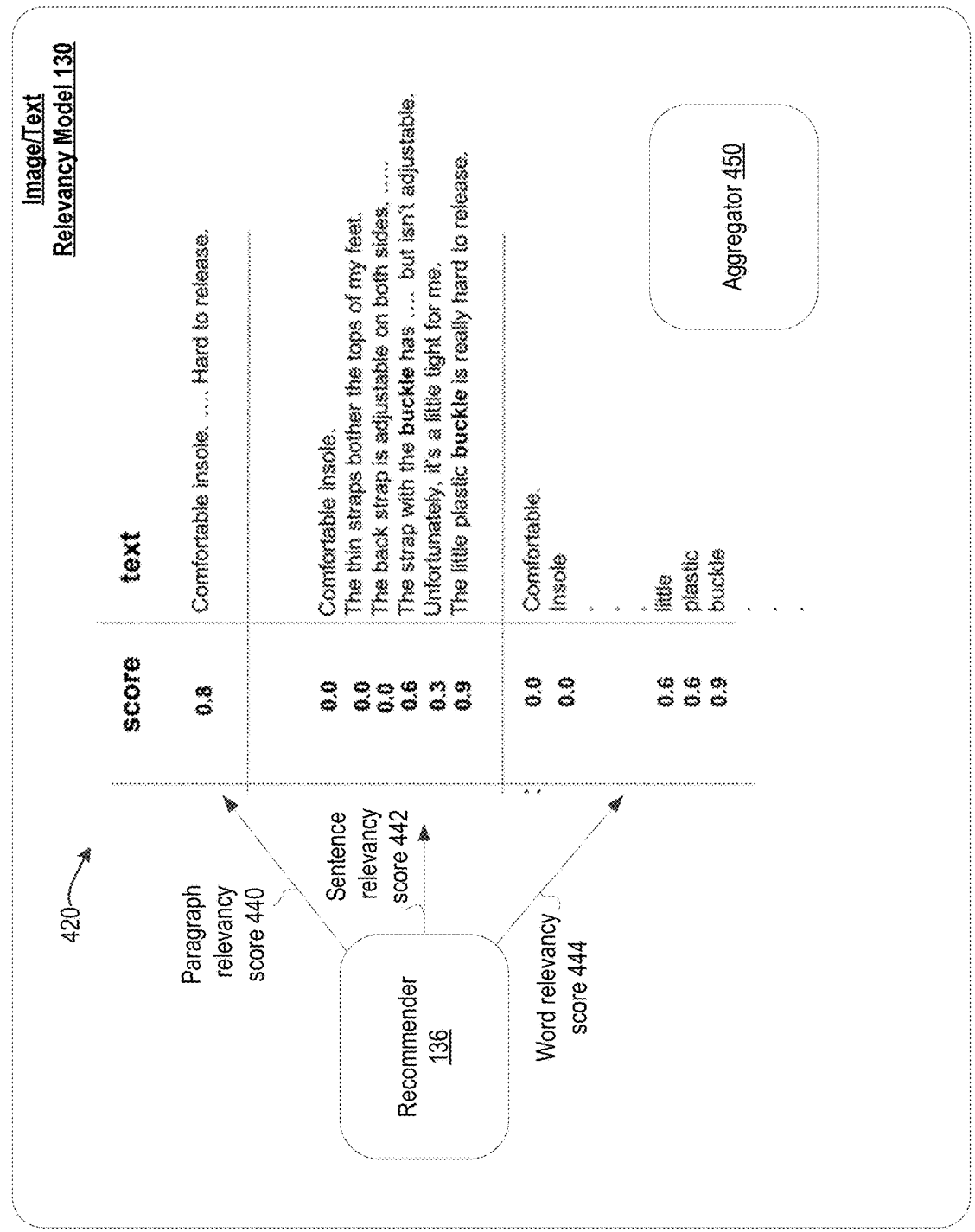
FIG. 4C depicts example components of an image/text relevancy model that may be used in accordance with various aspects of the present disclosure.

FIG. 4C depicts an example of per-word, per-sentence, and per-paragraph relevancy scoring for text data 422 of FIG. 4B. Recommender 136 may generate the word relevancy score 444. Generally, image/text relevancy model 130 may generate weights (e.g., relevancy scores) for input vectors representing words, based on the input vectors themselves and based on an input visual feature vector. The word relevancy scores 444 may be initially generated. Thereafter, sentences, or other textual segments, may be ranked based on the average of the word relevancy scores within the sentence to generate sentence relevancy scores 442. Similarly, if desired, paragraphs relevancy scores 440 may be generated using the average of the sentence relevancy scores making up the paragraphs.

In various examples, recommender 136 may emphasize sentences including words with a high relevancy score (e.g., above a relevancy threshold) or may emphasize sentences, paragraphs, pages, or any other unit of text using the above-described techniques. Additionally, in various examples, image/text relevancy model 130 may include an aggregator 450 effective to aggregate relevant text together for emphasis. Aggregator 450 may use the highest rank sentence and/or textual segment and may be a machine learning model trained to summarize the highest rank sentence and/or textual segment. The sentence may be summarized using the constituent word weights (e.g., relevancy scores) of the words of the sentence. Additionally, several sentences (e.g., sentences with sentence relevancy scores above a threshold) may be summarized by taking into account the sentence's relevancy score and, within each sentence, the word relevancy score of the words found in the sentence.

For example, the sentence, "The little plastic buckle is really hard to release" has the highest relevancy score (0.9) among those depicted in FIG. 4C at 0.9. The sentence "The strap with the buckle has a bit of elastic, but isn't adjustable" has the second highest relevancy score (0.6) among those depicted in FIG. 4C. Accordingly, based on the relevancy scores of these sentences and the relevancy scores of the words of the two sentences, aggregator 450 may be trained to generate an aggregated sentence, such as "The buckle is hard to release, and its strap is not adjustable." In various examples, this aggregated text and/or a pointer to a memory location at which this aggregated text is stored may be stored in a lookup table (e.g., lookup table 210a of FIG. 4A) in association with the bounding box 412 around the buckle 414.

Figure 4D:
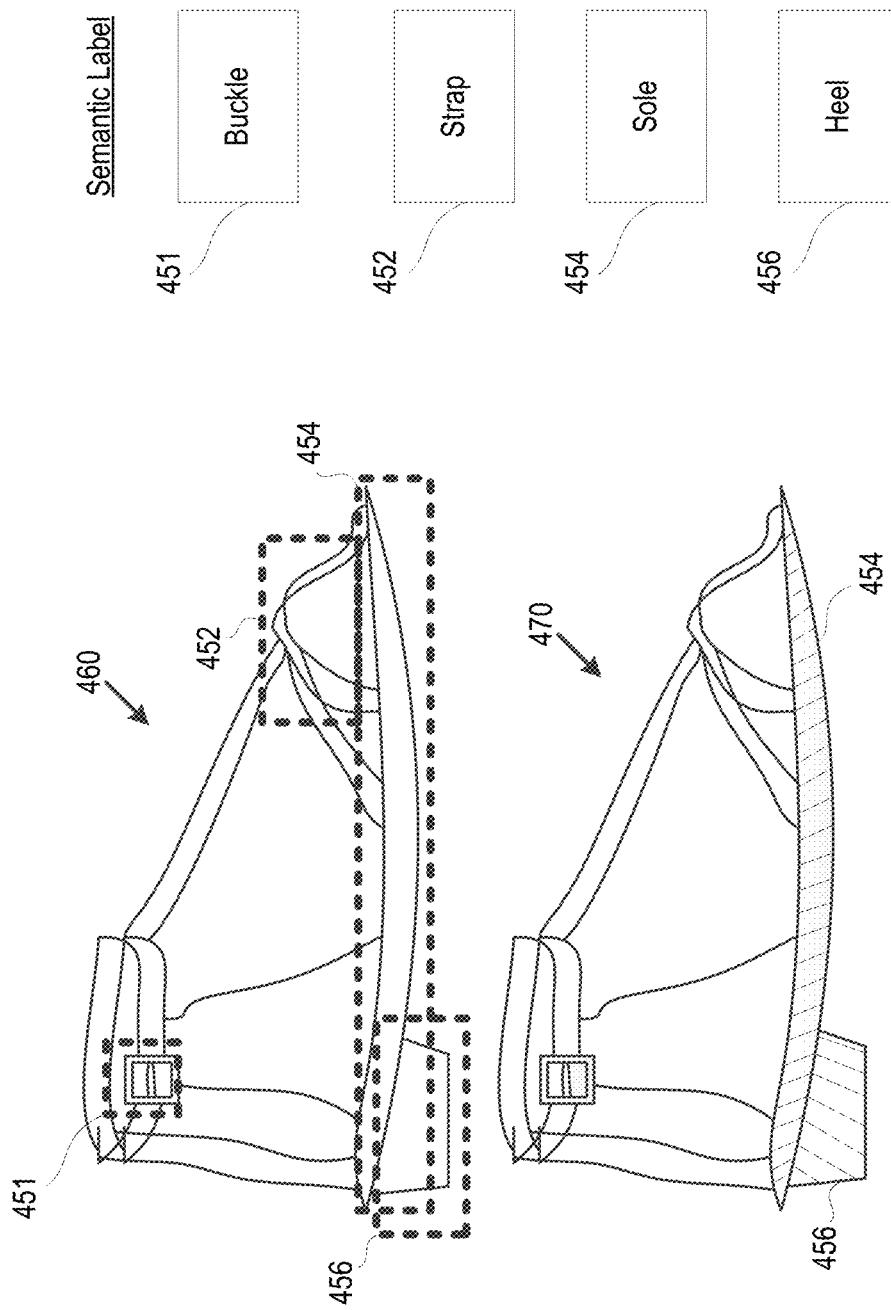
FIG. 4D depicts examples of semantic maps of object image data that may be used to extract visual feature vectors, in accordance with various aspects of the present disclosure.

FIG. 4D depicts examples of semantic maps 460 and 470 of object image data that may be used to extract visual feature vectors, in accordance with various aspects of the present disclosure. As previously described, image feature extractor 132 may be effective to generate feature representation vectors representing portions of an image (e.g., visual feature vectors). In various examples, the feature representation vectors may be a numerical representation of a portion of the image and may include semantic information describing, identifying, and/or categorizing the portion of the image. Additionally, in some examples, contextual metadata associated with various images may be used to extract feature representation vectors representing a portion of the image. For example, contextual details concerning a depicted object may be known and encoded in metadata associated with the image of the object (or a portion thereof). For example, if a black shoe is depicted, metadata details related to the shoe (or portions thereof) may include "black", "shoe", "buckle", etc. Image feature extractor 132 may use such metadata as inputs, along with the image data itself and may generate visual feature vectors representing portions of the image.

In various examples, semantic maps of object image data may be computed and may be accessible by image feature extractor 132. Image feature extractor 132 may use metadata associated with the semantic maps to generate visual feature vectors. Two example semantic maps of an identical shoe are depicted in FIG. 4D—semantic map 460 and semantic map 470. In semantic map 460, a semantic label (e.g., metadata associated with a portion of the shoe) is computed for areas of the image (e.g., defined by bounding boxes). For example, the semantic label "Buckle" (451) is associated with a first bounding box, the semantic label "Strap" (452) is associated with a second bounding box, the semantic label "Sole" (454) is associated with a third bounding box, and the semantic label "Heel" is associated with a fourth bounding box.

In the example semantic map 470, each semantic label is associated with pixels representing that portion of the object. In other words, semantic labels are provided on a pixel-by-pixel basis. This is represented in semantic map 470 by showing a first shading on the heel of the shoe and a second shading on the sole of the shoe. Pixels of the heel of the shoe are associated with the semantic label "Heel" (456), pixels of the sole of the shoe are associated with the semantic label "Sole" (454), and so forth. Although, the semantic labels in FIG. 4D are descriptive contextual metadata, other types of metadata may be included. For example, semantic label metadata may describe dimensions of a certain component, functions, color, composition, or any desired metadata. In various examples, the semantic maps depicted in FIG. 4D may themselves be generated by a machine learning model trained to generate such semantic maps using annotated image data.

Image feature extractor 132 (FIGS. 1, 4A, 4B) may use the semantic maps and/or contextual metadata (e.g., semantic labels) harvested from the semantic map as an input to generate the visual feature vectors described above. In various examples, image feature extractor 132 may use one or more of the following inputs to generate visual feature vectors representing various portions of a depicted object: the original image data, semantic maps, attributes of the object, and any other accessible metadata associated with the object and/or with the image data representing the object. In addition, recommender 136 may be trained to use such data (e.g., the original image data, semantic maps, attributes of the object, and any other accessible metadata associated with the object and/or with the image data representing the object) in order to form associations (e.g., determine a correspondence and/or relevancy score) between portions of input image data and portions of input text data. Furthermore, aggregator 450 may be trained to use such data (e.g., the original image data, semantic maps, attributes of the object, and any other accessible metadata associated with the object and/or with the image data representing the object) in order to aggregate text relevant to a particular portion of the image data.

Figure 5:
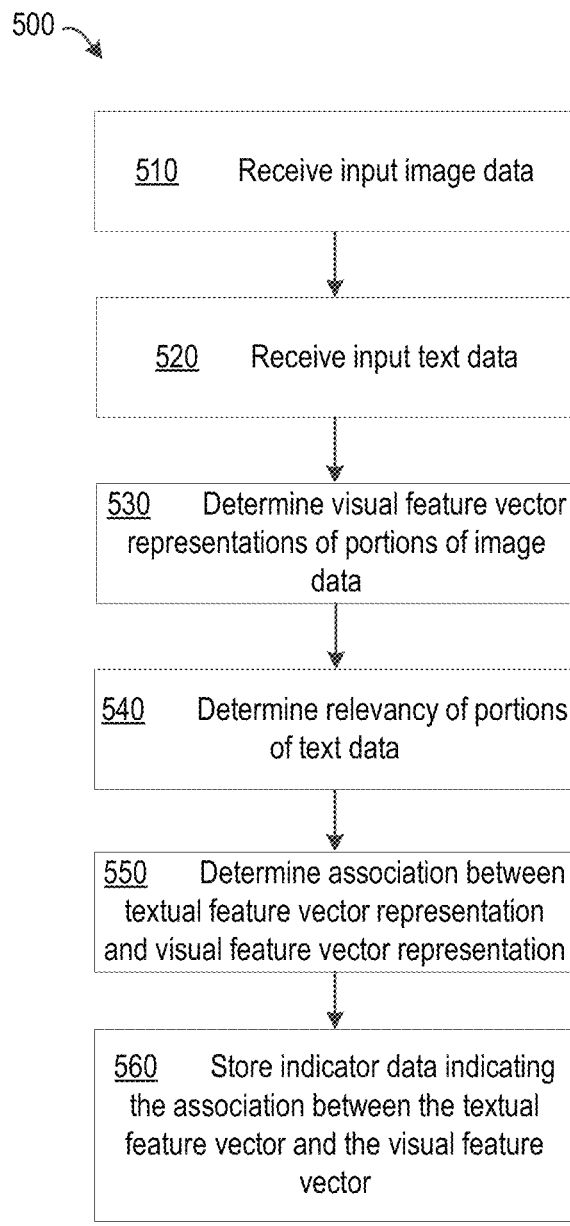
FIG. 5 depicts a flowchart illustrating an example process for relevant text prediction based on image feature selection, in accordance with embodiments of the present disclosure.

FIG. 5 depicts a flowchart illustrating an example process 500 for relevant text prediction based on image feature selection, in accordance with embodiments of the present disclosure. The actions of the process flow 500 may represent a series of instructions comprising computer readable machine code executable by a processing unit of a computing device. In various examples, the computer readable machine codes may be comprised of instructions selected from a native instruction set of the computing device and/or an operating system of the computing device.

Processing may begin at action 510, "Receive input image data". At action 510, a system, such as image/text relevancy model 130, may receive input image data. Similarly, at action 520, a system, such as image/text relevancy model 130, may receive input text data". In various examples, the image data and text data received at actions 510 and 520 may be a part of a webpage, digital file, document, and/or group of documents, in accordance with various implementations.

Processing may proceed to action 530, "Determine visual feature vector representations of portion of image data". At action 530, a system such as image feature extractor 132 may determine visual feature vector representations of one or more portions of the image data received at action 510. In various examples, image feature extractor 132 may include a machine learning model trained to receive image data (and/or text data), to identify different portions of the image data (e.g., portions identified by bounding boxes, and/or by one or more pixels), and to output a visual feature vector representation that semantically describes the portion of the image data. Additionally, the image feature extractor 132 may output data indicating the location and/or address of the relevant portion of the image.

Processing may proceed to action 540, "Determine relevancy of portions of text data". At action 540, a system such as text model 134 may determine the relevancy of various text to a particular visual feature vector. For example, as described above, textual feature vector representations may be determined for the one or more portions of the text data received at action 520. In various examples, text model 134 may include a machine learning model trained to receive text data (and/or image data), to identify different portions of the text data (e.g., words, sentences, paragraphs, pages, etc.), and to output a textual feature vector representation that semantically describes the portion of the text data. In various other examples, text model 134 may instead include a machine learning model trained to receive the visual feature vector determined at action 530. The text model 134 may be trained to determine relevancy scores of different portions of text data based on the input visual feature vector used to initialize text model 134. Accordingly, the relevancy (and thus the relevancy scores) of various portions of text may be conditioned on the visual feature vector. Additionally, the text model 134 may output data indicating the location and/or address of the relevant portion of the text.

Processing may proceed to action 550, "Determine association between textual feature vector representation and visual feature vector representation". In some examples, at action 550, a system such as recommender 136 may compare visual feature vectors to textual feature vectors for a particular page, documents, and/or other grouping of data. The recommender 136 may determine a distance in the feature space between textual feature vectors and visual feature vectors. In other examples, recommender 136 may determine the most relevant portions of text data by comparing the relevancy scores of various portions of text. For example, the recommender 136 may determine the 5 sentences with the highest relevancy scores. In other examples, the recommender 136 may identify all sentences or words with a relevancy score that exceeds a relevancy threshold. If a correspondence is determined (e.g., if a visual feature vector and a textual feature vector match to within a tunable tolerance level or if a relevancy score is determined to be sufficiently high), a determination may be made that the relevant portion of the image and the portion of the text are associated. In other words, a determination may be made that the text represented by the textual feature vector is relevant to the portion of the image and is likely to be of interest to a user that has selected or is otherwise interacting with the portion of the image.

Processing may continue to action 560, "Store indicator data indicating the association between the textual feature vector and the visual feature vector". At action 560, a computing device(s) 102 may store data indicating the association between the portion of the image and the text relevant to that portion of the image. For example, data may be stored indicating that a particular portion of the image data (including a location such as a bounding box, pixel identification, and/or address) is associated with one or more portions of text (e.g., one or more words and/or sentences) and/or with aggregated relevant text. The association may include the location of the relevant text and may include instructions effective to be executed by a browser and/or other viewing application effective to cause the text to be prominently displayed, highlighted, selected, and/or navigated to in response to user interaction with the portion of the image to which the text is related.

Figure 6:
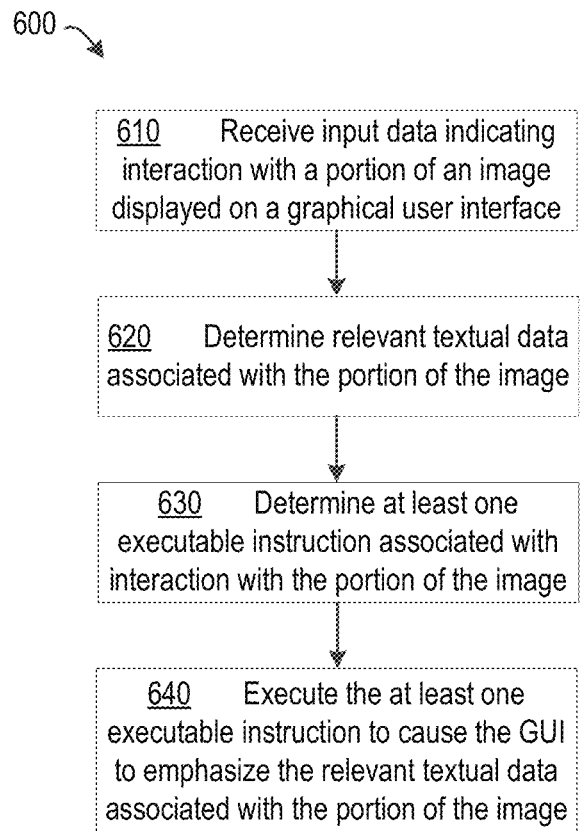
FIG. 6 depicts a flowchart illustrating an example process for providing executable instructions to cause a graphical user interface to emphasize relevant text based on image feature selection, in accordance with various embodiments of the present disclosure.

FIG. 6 depicts a flowchart illustrating an example process 600 for providing executable instructions to cause a graphical user interface to emphasize relevant text based on image feature selection, in accordance with various embodiments of the present disclosure. The actions of the process flow 500 may represent a series of instructions comprising computer readable machine code executable by a processing unit of a computing device. In various examples, the computer readable machine codes may be comprised of instructions selected from a native instruction set of the computing device and/or an operating system of the computing device.

Processing may begin at action 610, "Receive input data indicating interaction with a portion of an image displayed on a graphical user interface." At action 610, input data may be received that indicates that a user is interacting with a portion of an image displayed on a GUI such as GUI 110. Examples of user interactions may include mouse clicks on the portion of the image, touch screen selections of the portion of the image, hovering a mouse pointer or other indicator over a particular portion of an image, determining that a user is looking at a particular portion of an image (e.g., for more than a threshold amount of time) using a gaze tracker, zooming in on a particular portion of an image, etc. Data indicating selection of/interaction with the particular portion of the image may be passed to computing device(s) 102, which may be, in some examples, a computing device providing the GUI 110.

Processing may proceed to action 620, "Determine relevant textual data associated with the portion of the image". At action 620, the relevant textual data that is associated with the portion of the image being interacted with may be determined. As previously described, the relevant textual data may be determined from a data structure such as a lookup table associated with the GUI 110 and/or with the particular web page or document.

Processing may proceed to action 630, "Determine at least one executable instruction associated with interaction with the portion of the image". At action 630, an executable instruction executable by computing device(s) 102 and/or by another device providing GUI 110, may be determined. In various examples, the executable instruction may be associated with the portion of the image data that is currently being interacted with. For example, the executable instruction and/or a pointer to the executable instruction may be stored in the lookup table or other data structure in association with the portion of the image data and the associated text.

Processing may proceed to action 640, "Execute the at least one executable instruction to cause the GUI to emphasize the relevant textual data associated with the portion of the image." At action 640, computing device(s) 102 providing the GUI 110 may execute the at least one executable instruction determined at action 630 to cause the GUI 110 to emphasize the relevant textual data determined at action 620. As previously described, the GUI 110 may emphasize the relevant text in various ways such as by presenting the text in a specified region of the GUI that is currently displayed (e.g., in a transparent overlay), by highlighting the text, and/or by providing navigation tools (e.g., selectable GUI elements) effective to navigate through the different relevant portions of the text (e.g., to navigate between sentences relevant to the portion of the image data).

Among other benefits, a system in accordance with the present disclosure may provide an improved graphical interface able to dynamically identify text that is contextually relevant to different portions of image data. Accordingly, a graphical user interface in accordance with the present disclosure allows a computing device to form associations between image data and contextually relevant portions of text that are likely to be of interest to a user. Such a graphical user interface provides executable instructions relevant to the portion of the image data that are executable by a computing device to cause the GUI to display and/or highlight the most relevant portions of text automatically without manual annotation, linkage, and/or exhaustive searching.

Figure 7:
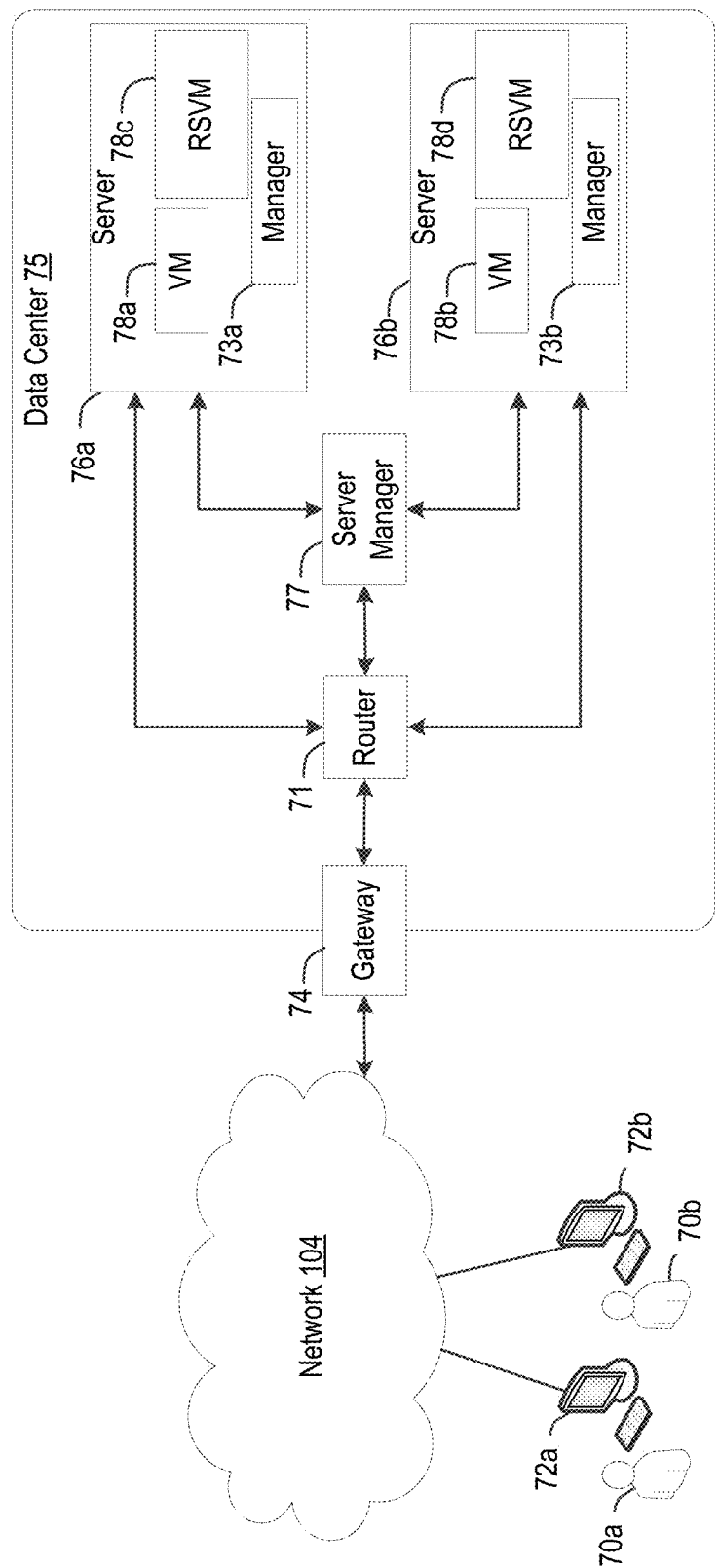
FIG. 7 is a diagram illustrating an example system for sending and providing data that may be used in accordance with the present disclosure.

An example system for sending and providing data and for providing relevant text predication based on image feature selection will now be described in detail. In particular, FIG. 7 illustrates an example computing environment in which the embodiments described herein may be implemented. FIG. 7 is a diagram schematically illustrating an example of a data center 75 that can provide computing resources to users 70a and 70b (which may be referred herein singularly as user 70 or in the plural as users 70) via user computers 72a and 72b (which may be referred herein singularly as computer 72 or in the plural as computers 72) via network 104. Data center 75 may be configured to provide computing resources for executing applications on a permanent or an as-needed basis. The computing resources provided by data center 75 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 75 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). In at least some examples, server manager 77 may control operation of and/or maintain servers 76. Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to computers 72. User computers 72 may be computers utilized by users 70 or other customers of data center 75. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 75. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 75. In this regard, data center 75 might provide a gateway or web interface through which aspects of its operation may be configured through the use of a web browser application program executing on user computer 72. Alternately, a stand-alone application program executing on user computer 72 might access an application programming interface (API) exposed by data center 75 for performing the configuration operations. Other mechanisms for configuring the operation of various web services available at data center 75 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 73a or 73b (which may be referred herein singularly as instance manager 73 or in the plural as instance managers 73) capable of executing the virtual machine instances 78. The instance managers 73 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 75 shown in FIG. 7, a router 71 may be utilized to interconnect the servers 76a and 76b. Router 71 may also be connected to gateway 74, which is connected to network 104. Router 71 may be connected to one or more load balancers, and alone or in combination may manage communications within networks in data center 75, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 75 shown in FIG. 7, a data center 75 is also employed to at least in part direct various communications to, from and/or between servers 76a and 76b. While FIG. 7 depicts router 71 positioned between gateway 74 and data center 75, this is merely an exemplary configuration. In some cases, for example, data center 75 may be positioned between gateway 74 and router 71. Data center 75 may, in some cases, examine portions of incoming communications from user computers 72 to determine one or more appropriate servers 76 to receive and/or process the incoming communications. Data center 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Data center 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 75 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A computer-implemented method of linking image data and text data, comprising:
    receiving image data depicting an object, wherein the image data comprises:
        a first portion, wherein, when rendered on a display, the first portion of the image data corresponds to a first plurality of pixels representing a first part of the object; and
        a second portion, wherein, when rendered, the second portion of the image data corresponds to a second plurality of pixels representing a second part of the object different than the first part;
    receiving text data comprising a description of the object;
    determining a first vector representation of the first portion of the image data;
    determining, from among the text data, first text of the text data comprising a first set of words that describe the first part of the object, wherein the first text of the text data is determined based at least in part on the first vector representation, and wherein the first text is a subset of the text data;
    determining a second vector representation of the second portion of the image data;
    determining, from among the text data, second text of the text data comprising a second set of words that describe the second part of the object, wherein the second text of the text data is determined based at least in part on the second vector representation, and wherein the second text is a second subset of the text data;
    storing, in a data structure, a first identifier of the first portion of the image data in association with the first text
    receiving an indication of an interaction with the first plurality of pixels rendered on the display;
    determining, from the data structure, that the first plurality of pixels corresponds to the first portion of the image data;
    determining, from the data structure, the first text; and
    executing instructions effective to cause a graphical user interface to provide access to and/or emphasize the first text on the display.

2. The method of claim 1, further comprising rendering at least a second portion of the first text in association with the first portion of the image data on the graphical user interface.

3. The method of claim 1, further comprising:
    receiving a semantic map of the image data;
    determining, from the semantic map, contextual metadata associated with the first portion of the image data; and
    providing the contextual metadata and the image data to a first machine learning model trained to generate vector representations of the image data, wherein the determining the first vector representation of the first portion of the image data is based at least in part on the contextual metadata and the image data.

4. The method of claim 1, wherein the text data further comprises third text related to the first portion of the image data, the method further comprising:
    generating aggregated text comprising at least a portion of the first text and at least a portion of the third text; and
    storing, in the data structure, a third identifier of the aggregated text in association with the first identifier.

5. The method of claim 1, further comprising:
    providing a selectable graphical element on the display in association with the image data rendered on the display;
    receiving a first data input indicating a first selection of the selectable graphical element on the display;
    navigating to a second portion of the first text based at least in part on the first data input;
    receiving a second data input indicating a second selection of the selectable graphical element on the display; and
    navigating to a third portion of the first text based at least in part on the second data input, wherein at least one of the second portion of the first text and the third portion of the first text are located on a web page different from the web page displaying the image data.

6. The method of claim 1, further comprising:
    receiving, by a convolutional neural network, the image data; and
    determining, by the convolutional neural network, that the image data comprises the first portion, wherein the determining the first vector representation of the first portion of the image data comprises generating a first semantic interpretation of the first portion of the image data in a first feature space, and representing the first semantic interpretation of the first portion of the image data as the first vector representation in the first feature space.

7. The method of claim 6, further comprising:
    receiving, by a machine learning model, the first vector representation of the first portion of the image data; and
    determining, by the machine learning model, a relevancy score related to the first text based at least in part on the first vector representation, wherein the relevancy score represents a contextual relevance of the first text to the first portion of the image data.

8. The method of claim 1, further comprising:
    storing, in the data structure, a second identifier corresponding to the second portion of the image data in association with the second text.

9. A computing system, comprising:
at least one processor; and
at least one non-transitory computer readable medium storing instructions that, when executed by the at least one processor, program the at least one processor to perform a method comprising:
receiving image data depicting an object, wherein the image data comprises:
a first portion, wherein, when rendered on a display, the first portion of the image data corresponds to a first plurality of pixels representing a first part of the object; and
a second portion, wherein, when rendered, the second portion of the image data corresponds to a second plurality of pixels representing a second part of the object different than the first part;
receiving text data comprising a description of the object;
determining a first vector representation of the first portion of the image data;
determining, from among the text data, first text of the text data comprising a first set of words that describe the first part of the object, wherein the first text of the text data is determined based at least in part on the first vector representation, and wherein the first text is a subset of the text data;
determining a second vector representation of the second portion of the image data;
determining, from among the text data, second text of the text data comprising a second set of words that describe the second part of the object, wherein the second text of the text data is determined based at least in part on the second vector representation, and wherein the second text is a second subset of the text data;
storing, in a data structure, a first identifier of the first portion of the image data in association with the first text;
receiving an indication of an interaction with the first plurality of pixels rendered on the display;
determining, from the data structure, that the first plurality of pixels corresponds to the first portion of the image data;
determining, from the data structure, the first text; and
executing instructions effective to cause a graphical user interface to provide access to and/or emphasize the first text on the display.

10. The computing system of claim 9, wherein the instructions, when executed by the at least one processor, program the at least one processor to perform the method further comprising rendering at least a second portion of the first text in association with the first portion of the image data on the graphical user interface.

11. The computing system of claim 9, wherein the instructions, when executed by the at least one processor, program the at least one processor to perform the method further comprising displaying a link to a second portion of the first text related to the first portion of the image data based at least in part on the indication of the interaction with the first plurality of pixels rendered on the display.

12. The computing system of claim 9, wherein the text data further comprises third text related to the first portion of the image data, and wherein the instructions, when executed by the at least one processor, program the at least one processor to perform the method further comprising:
generating aggregated text comprising at least a portion of the first text and at least a portion of the third text; and
storing, in the data structure, a third identifier of the aggregated text in association with the first identifier.

13. The computing system of claim 9, wherein the instructions, when executed by the at least one processor, program the at least one processor to perform the method further comprising:
providing a selectable graphical element on the display in association with the image data rendered on the display;
receiving a first data input indicating a first selection of the selectable graphical element on the display;
navigating to a second portion of the first text based at least in part on the first data input;
receiving a second data input indicating a second selection of the selectable graphical element on the display; and
navigating to a third portion of the first text based at least in part on the second data input, wherein at least one of the second portion of the first text and the third portion of the first text are located on a web page different from the web page displaying the image data.

14. The computing system of claim 9, wherein the instructions, when executed by the at least one processor, program the at least one processor to perform the method further comprising:
receiving, by a convolutional neural network, the image data; and
determining, by the convolutional neural network, that the image data comprises the first portion, wherein the determining the first vector representation of the first portion of the image data comprises generating a first semantic interpretation of the first portion of the image data in a first feature space, and representing the first semantic interpretation of the first portion of the image data as the first vector representation in the first feature space.

15. The computing system of claim 14, wherein the instructions, when executed by the at least one processor, program the at least one processor to perform the method further comprising:
receiving, by a machine learning model, the first vector representation of the first portion of the image data; and
determining, by the machine learning model, a relevancy score related to the first text based at least in part on the first vector representation, wherein the relevancy score represents a contextual relevance of the first text to the first portion of the image data.

16. The computing system of claim 9, wherein the instructions, when executed by the at least one processor, program the at least one processor to perform the method further comprising:
storing, in the data structure, location data identifying a location of the first plurality of pixels when the first portion of the image data is rendered on the display, wherein the location data is stored in association with the first identifier of the first portion of the image data and the first text.

17. The computing system of claim 9, wherein the instructions, when executed by the at least one processor, program the at least one processor to perform the method further comprising:
storing, in the data structure, a second identifier corresponding to the second portion of the image data in association with the second text.

18. A method comprising:
receiving image data depicting an object, wherein the image data comprises:

a first portion, wherein, when rendered on a display, the first portion of the image data corresponds to a first plurality of pixels representing a first part of the object; and a second portion, wherein, when rendered, the second portion of the image data corresponds to a second plurality of pixels representing a second part of the object different than the first part;

receiving text data comprising a description of the object;

determining a first vector representation of the first portion of the image data;

determining, from among the text data, first text of the text data comprising a first set of words that describe the first part of the object, wherein the first text of the text data is determined based at least in part on the first vector representation, and wherein the first text is a subset of the text data;

determining a second vector representation of the second portion of the image data;

determining, from among the text data, second text of the text data comprising a second set of words that describe the second part of the object, wherein the second text of the text data is determined based at least in part on the second vector representation, and wherein the second text is a second subset of the text data providing a selectable graphical element on the display in association with the image data rendered on the display;

receiving a first data input indicating a first selection of the selectable graphical element on the display;

navigating to a second portion of the first text based at least in part on the first data input;

receiving a second data input indicating a second selection of the selectable graphical element on the display; and navigating to a third portion of the first text based at least in part on the second data input, wherein at least one of the second portion of the first text and the third portion of the first text are located on a web page different from the web page displaying the image data.

19. The method of claim 18, further comprising:

determining a correspondence between the first portion of the image data and the first text based at least in part on a correspondence between the first vector representation and the second vector representation.

20. The method of claim 18, further comprising:

receiving a semantic map of the image data;

determining, from the semantic map, contextual metadata associated with the first portion of the image data; and providing the contextual metadata and the image data to a first machine learning model trained to generate vector representations of the image data, wherein the determining the first vector representation of the first portion of the image data is based at least in part on the contextual metadata and the image data.

\* \* \* \* \*